United States Patent
Kawamura et al.

(10) Patent No.: US 6,662,790 B1
(45) Date of Patent: Dec. 16, 2003

(54) METHOD FOR CONTROLLING EXHAUST GAS RECIRCULATION VALVE

(75) Inventors: Satoshi Kawamura, Tokyo (JP); Sotsuo Miyoshi, Tokyo (JP); Toshihiko Miyake, Tokyo (JP); Youichi Fujita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 75 days.

(21) Appl. No.: 10/110,314

(22) PCT Filed: Aug. 14, 2000

(86) PCT No.: PCT/JP00/05443

§ 371 (c)(1),
(2), (4) Date: Apr. 11, 2002

(87) PCT Pub. No.: WO02/14673

PCT Pub. Date: Feb. 21, 2002

(51) Int. Cl.$^7$ ................................................ F02M 25/07
(52) U.S. Cl. .............................. 123/568.23; 251/129.12
(58) Field of Search ...................... 123/568.23, 568.24; 251/129.11, 129.12, 129.13

(56) References Cited

U.S. PATENT DOCUMENTS

| | | | | | |
|---|---|---|---|---|---|
| 4,114,465 | A | * | 9/1978 | Troy | 74/89.17 |
| 4,608,820 | A | * | 9/1986 | White et al. | 60/39.281 |
| 6,302,089 | B1 | * | 10/2001 | Zimmermann | 123/568.24 |
| 6,546,920 | B1 | * | 4/2003 | Kawamura et al. | 123/568.23 |

FOREIGN PATENT DOCUMENTS

| | | |
|---|---|---|
| JP | 11-159405 | 6/1999 |
| JP | 11-194825 | 7/1999 |

* cited by examiner

*Primary Examiner*—Henry C. Yuen
*Assistant Examiner*—Arnold Castro
(74) *Attorney, Agent, or Firm*—Sughrue Mion, PLLC (57) ABSTRACT

When an open-close valve does not operate despite a full (100%) continuous power feeding to a driving motor for an exhaust gas recirculation valve provided in an exhaust gas recirculation system, the power feeding to the motor is stopped to prevent previously the occurrence of a seizure of the motor.

4 Claims, 7 Drawing Sheets

METHOD FOR CONTROLLING EXHAUST GAS RECIRCULATION VALVE

TECHNICAL FIELD

This invention relates to a method of controlling an exhaust gas recirculation valve (hereinafter referred to as an EGR valve) disposed in an exhaust gas recirculation system.

BACKGROUND ART

Figure 1:
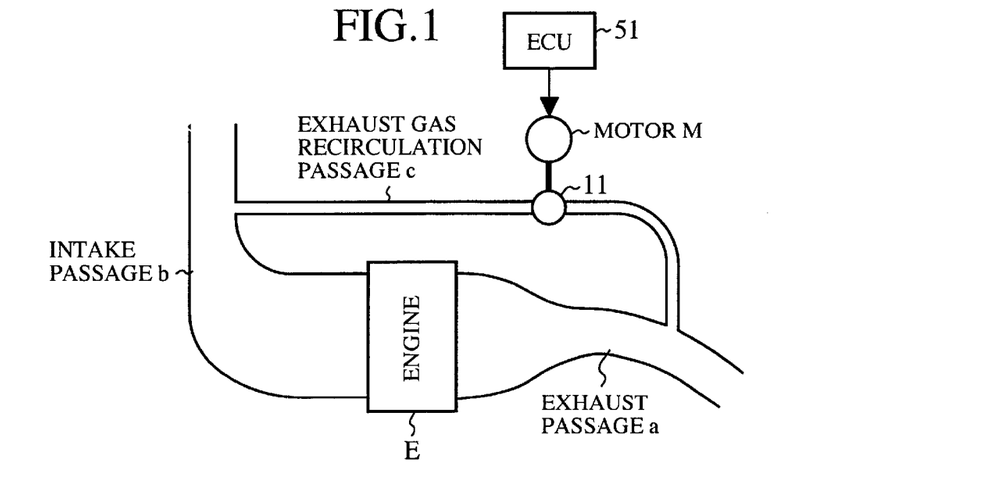
FIG. 1 is a conventional schematic diagram showing an arrangement of a control valve as an EGR valve disposed in an exhaust gas recirculation passage c which communicates an exhaust passage "a" of an exhaust engine E with an intake passage b.

FIG. 1 is a conventional schematic diagram showing an arrangement of a control valve 11 as an EGR valve disposed in an exhaust gas recirculation passage c which communicates an exhaust passage "a" of an engine E with an intake passage b.

The method of controlling the EGR valve involves driving and controlling a stepping motor M of a hybrid PM type 4-phase construction or the like by an engine control unit (hereinafter referred to as ECU) 51, and controlling the opening and closing of the control valve 11 by this stepping motor M. An open-loop control of the stepping motor M by a stepping angle contributes to control over the degree of the opening of the control valve 11.

Such a control method using this kind of stepping motor M imposes restrictions on the control over the degree of the opening of the control valve 11 because the degree of the opening of the control valve 11 can be controlled only by the stepping angle of the stepping motor M. The control valve 11 has a limited resolution for the controllable opening. In addition, the stepping motor M has a limited open-loop control response characteristic due to the possible occurrence of a stepping-out phenomenon. Once the stepping-out has occurred, the reliability falls as an error is still contained uncompensated in the control amount.

To this end, the conventional control method of an EGR valve involves giving a predetermined return torque to the control valve 11 in the control valve closing direction and, by a unidirectional driving of a direct current (DC) motor M (hereinafter referred to as a motor M), giving a motor torque to vary the control valve 11 in the opening direction, and opening and closing the control valve 11 by the balance of these torque.

An arrangement is described in Japanese Published Patent Feeding No. 159405/1999. This arrangement includes an open loop control system for controlling an open loop of the motor M such that a motor torque is generated in correspondence with the target opening and closing position of the above control valve 11; and a feedback control system for feedback-controlling the motor M based on a deviation between input data corresponding to the target opening and closing position of the above control valve 11 and detected data of the current opening and closing position of the control valve 11.

Figure 2:
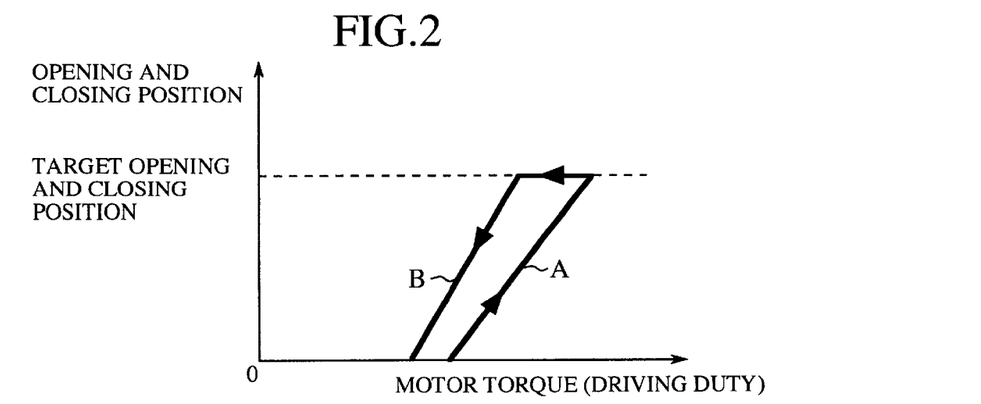
FIG. 2 is a characteristic diagram showing the relationship between a motor torque and an opening and closing. position of a control valve in an EGR valve of torque balance drive system.

FIG. 2 is a characteristic diagram showing the relationship between a motor torque and an opening and closing position of a control valve in an EGR valve of torque balance drive system.

First, the driving system using this motor M will be described. In case the degree of the opening of the control valve 11 is feedback-controlled by the motor M, the generated torque of the motor M is continuously controlled by feeding back the degree of the opening of the control valve 11 through unintermitted detection with a position sensor such as a sliding resistor type. Theoretically, the continuous control over the generated torque of the motor M promotes infinite reduction of the resolution of the controllable opening of the control valve 11.

This kind of method of controlling the EGR valve using the motor M adopted a so-called torque balance method. The method involves giving a predetermined return torque in the closing direction by means of a spring as urging means, giving a motor torque variable in the opening direction by driving the motor M in the opening direction, and determining the valve opening position by the balance of these torque.

In case this kind of control method is adopted, since the EGR valve is constantly given the return torque, the opening and closing positions (shift amount) vary in correspondence with the inclination of lines A, B having a hysteresis characteristics due to friction as shown in FIG. 2.

Here, line A indicates an operating characteristic when the control valve 11 is opened by increasing the motor torque, and line B an operating characteristic when the control valve 11 is closed by reducing the motor torque. The inclination of the operating characteristics A, B varies depending on the spring constant of the spring to give the return torque, and the operating characteristics A, B shift to the right or left in FIG. 2 depending on the magnitude of the set torque.

Now, in order to control the control valve 11 having this kind of operating characteristics, suppose that a method is admitted, in which the motor is under the control of a P(proportional) I(integral) control based on a deviation between the input data corresponding to the target opening and closing position of the control valve 11 and the detected data of the current opening and closing position of the control valve. In this case, owing to the relation of the operating characteristics A, B as shown in FIG. 2, it becomes difficult to stabilize the control valve 11 at the target opening position.

In other words, in order to open the control valve 11 to the target opening position by increasing the motor torque, the P gain and the I gain must be increased to take control along the operating characteristic A shown in FIG. 2. However, when the motor torque is increased by the PI control under the control of this kind, the deviation of the opening position of the control valve becomes "0" as soon as the control valve 11 is opened to the target opening position. The P component thus becomes "0" and the I component is cleared, with the result that the control valve 11 begins to close by the return torque.

Figure 3:
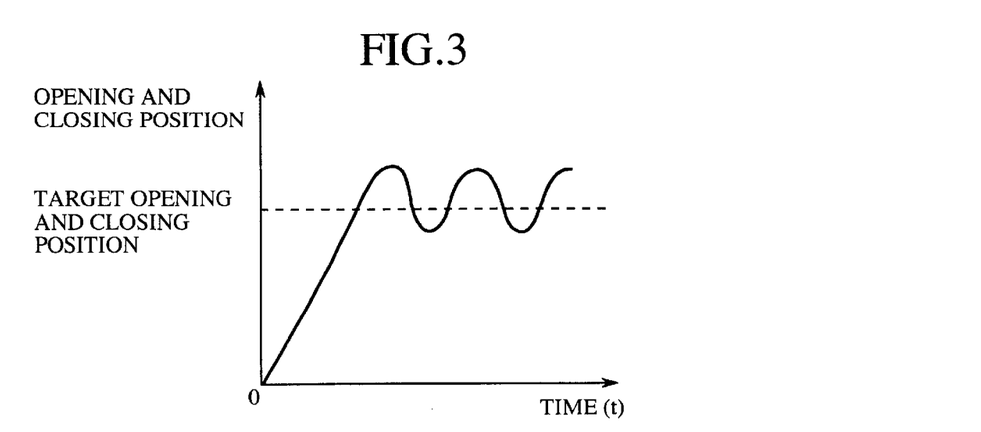
FIG. 3 is a characteristic diagram showing the relationship between the time and the operating position of a motor shaft.

FIG. 3 is a characteristic diagram showing the relationship between the time and the operating position of a motor shaft.

At an initial stage in which the control valve 11 begins to close (at the time the deviation is small), the P and I components are both small and therefore the motor torque cannot overwhelm the return torque, with the result that the deviation becomes large. Thereafter, even if the deviation becomes large to a certain degree, the motor torque and the return torque balance with each other, the closing operation of the control valve 11 cannot stop abruptly due to the inertia of the motor M. The control valve 11 thus cannot be opened immediately. If the gain is made large such that a relatively large motor torque is generated even at the time the deviation is small, there will be a vicious cycle that incurs an increase of the overshooting and undershooting as shown in FIG. 3.

Figure 4:
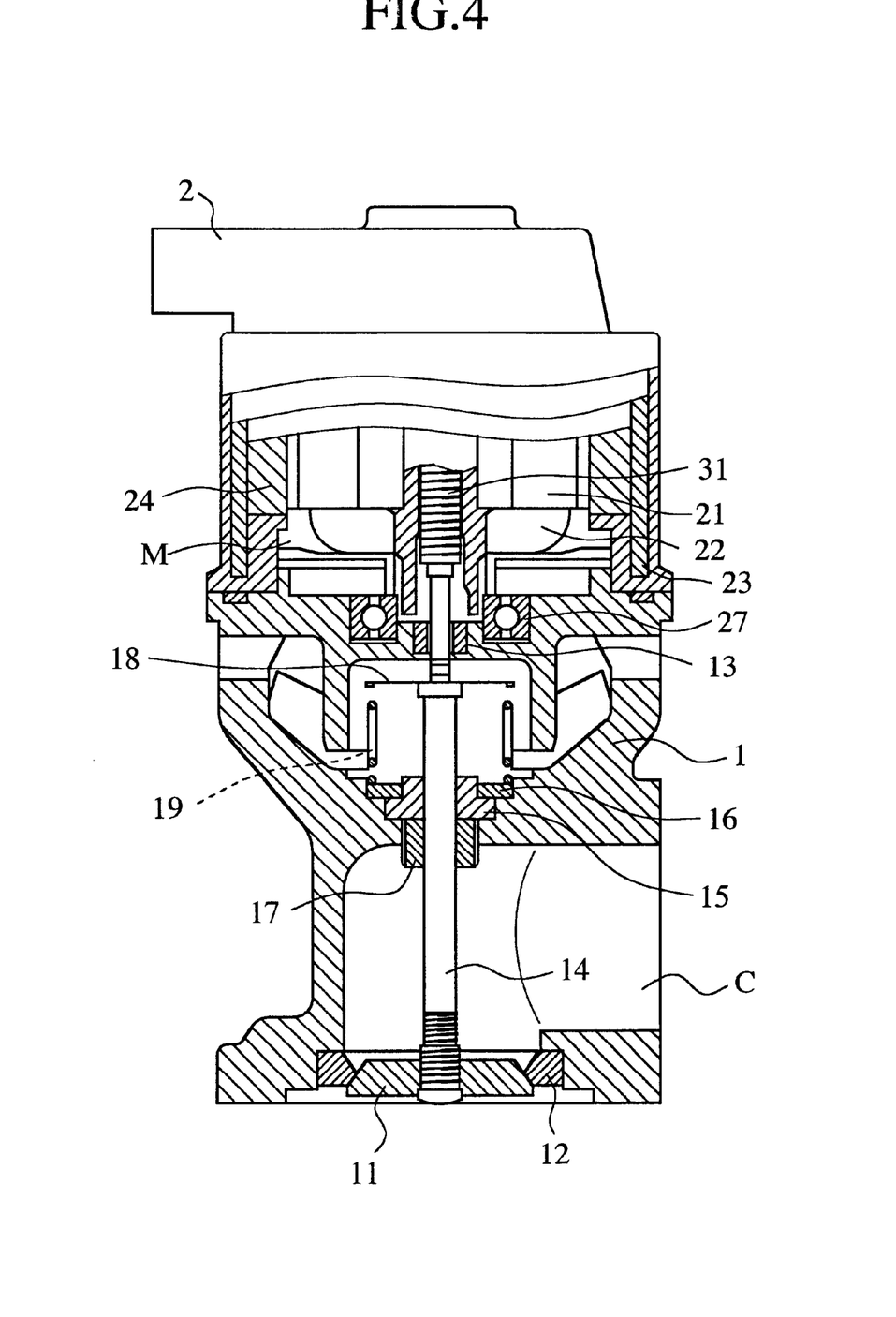
FIG. 4 is a longitudinal sectional view of the EGR valve.

FIG. 4 is a longitudinal sectional view of the EGR valve.

The arrangement implementing a method of controlling the control valve 11 in a so-called torque balance drive system using the motor M will now be described, with due consideration of the above circumstance.

Figure 5:
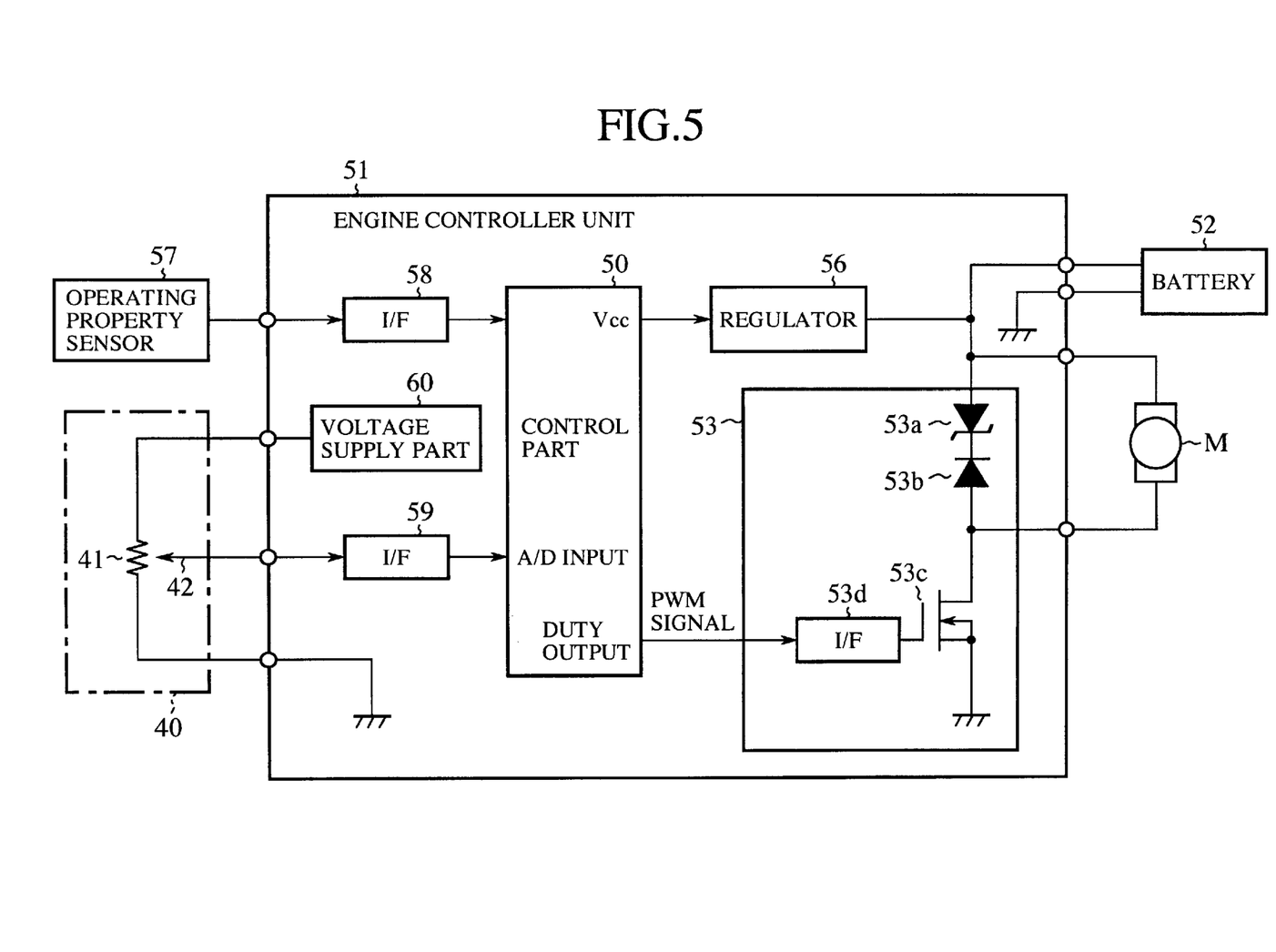
FIG. 5 is a block diagram of an ECU apparatus for carrying out the method of controlling the EGR valve in the so-called torque balance driving system using a motor.
Figure 6:
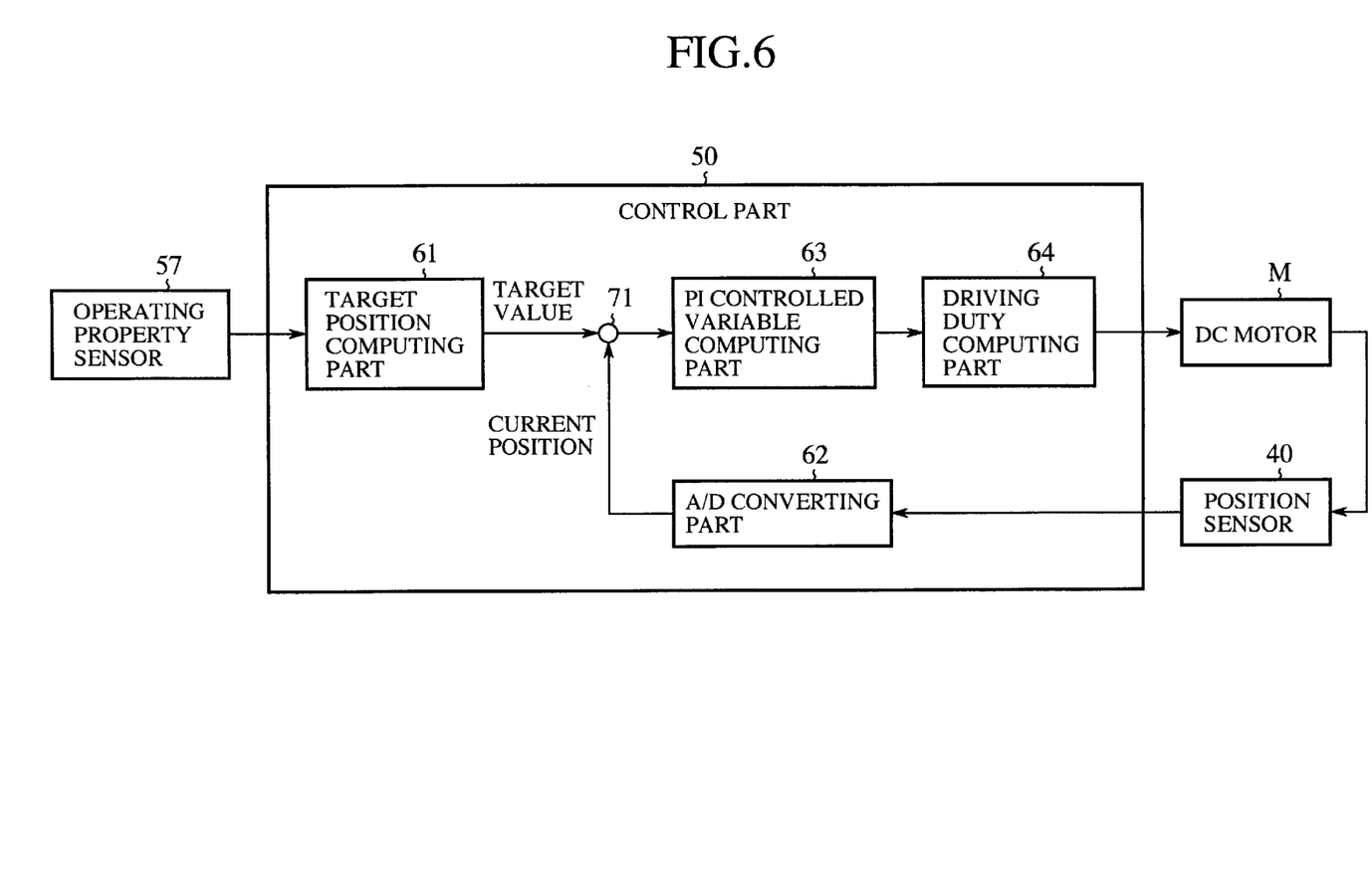
FIG. 6 is a block diagram showing a control part in the ECU.

Referring to FIG. 4, reference numeral 1 denotes a valve body having therein a passage forming a part of an exhaust gas recirculation passage c which is interposed in a recirculation system of the exhaust gas. By upwardly moving the control valve 11 to contact it with a valve seat 12 as shown in FIGS. 4 to 6 the exhaust gas recirculation passage c is closed. Conversely, by downwardly moving the control valve 11 to depart it from the valve seat 12 the exhaust gas recirculation passage c is opened.

Reference numeral 2 denotes a motor case for housing therein the motor M. Inside this motor case 2, reference numeral 21 denotes a rotor around which a coil 22 is wound, and reference numeral 23 a yoke with a magnet 24. The lower end of the rotor 21 is rotatably supported on the valve body 1 by a bearing 27.

Inside the rotor 21, a motor shaft 31 is screwed. The motor shaft 31 is prevented from rotating by a guide bush 13 in the body 1. It therefore follows that the motor shaft 31 moves in the upward and downward direction depending on the amount of rotation of the rotor 21. A valve shaft 14 is held in contact with the lower end of the motor shaft 31, and an intermediate portion of which is guided by a guide seal 15 and a guide plate 16 so as to be movable in the upward and downward direction relative to the valve body 1. The control valve 11 is attached to the lower end of the valve shaft 14.

Reference numeral 17 denotes a guide seal cover. Between a spring sheet 18 mounted on the upper end of the valve shaft 14 and the guide plate 16, a return spring 19 is interposed for urging the valve shaft 14 in the upward direction, i.e., in the closing direction to urge the control valve 11.

The control valve 11 thus constituted is driven by the torque balance system as described above. In other words, the control valve 11 is given a predetermined return torque by the return spring 19 as urging means in the control valve closing direction and is also given a variable motor torque in the control valve opening direction by driving the motor M. By the balance of these torque, the control valve 11 is opened and closed.

FIG. 5 is a block diagram of an ECU apparatus for carrying out the method of controlling the EGR valve in the so-called torque balance driving system using a motor.

Referring to FIG. 5 reference numeral 50 denotes a microcomputer as a control part for determining the motor driving voltage, and reference numeral 52 a battery. Reference numeral 53 denotes a motor driving voltage converting part for converting the output of the control part 50 to supply the converted output to the motor M, which includes a Zenor diode 53a; a diode 53b for passing a unidirectional current only to the motor M; a field-effect transistor (FET) 53c; and an interface 53d disposed between the control part 50 and the FET 53c. Reference numeral 56 denotes a regulator for generating a driving voltage (5V) of the control part 50.

The control part 50 receives as inputs through interfaces 58, 59, respectively, a detected signal from an operating property sensor 57 mounted on each part of the vehicle such as a crank angle sensor or the like, as well as a detected signal from the position sensor 40. The position sensor 40 in this example is provided with a movable contact part 42 movable on a resistor 41 to which a constant voltage (5V) is applied from a voltage supply part 60. With the movement of the movable contact part 42 as a result of the rotation of the rotor 21, a voltage corresponding to the rotating position of the rotary shaft 31 is outputted, as a detected signal, from the movable contact part 42.

Further, the above motor driving voltage converting part 53 switches on and off the voltage to be applied to the motor Mat a constant cycle. By a pulse-width modulation (PWM) signal whose pulse width is determined depending on the ratio of the on-time and the off-time per a cycle (driving duty), the FET 53c is switched to control an average driving voltage to be applied to the motor M.

FIG. 6 is a block diagram showing a control part in the ECU.

Referring to FIG. 6, reference numeral 61 denotes a target position computing part for computing an optimum opening and closing position of the control valve 11 based on the detected signal of the operating property sensor 57, which outputs a voltage corresponding to the target position (hereinafter referred to as a "target value"). Reference numeral 62 denotes an analog-digital (A/D) converter for performing an A/D conversion of a detected signal of the position sensor. 40, which outputs a voltage corresponding to the current position (hereinafter referred to as a "current value"). Reference numeral 71 denotes an adder-subtractor for adding or subtracting the target value and the current value. Reference numeral 63 denotes a PI controlled variable computing part for computing and outputting the PI controlled variable (voltage) by combining the proportional component (P component) and the integral component (I component) based on the deviation between the target value and the current value. Reference numeral 64 denotes a driving duty computing part for computing the duty to be supplied to the motor M based on the output of the PI controlled variable computing part 63.

Then, the operation of the control part will be described.

When a target value is given from outside, the current value detected by the position sensor 40 and the above target value are added or subtracted by the adding-subtracting part 71 to obtain a deviation. The PI controlled variable computing part 63 computes a PI controlled variable from the obtained deviation and outputs the computed PI controlled variable to the driving duty computing part 64. The driving duty computing part 64 computes the driving duty based on the PI controlled variable and outputs the computed driving variable to the motor M.

Such a conventional method of controlling the EGR valve, in case the valve shaft ceases to move due to biting, clogging of dirt, or the like, also ceases to move the motor shaft which is in abutment with the valve shaft. As a result, the motor extraordinarily generates heat caused by the applied electric current and is in a danger of a seizure. The conventional method of controlling the EGR valve cannot be quickly and appropriately deals with this kind of accident.

The invention has been made to solve the above and other problems and an object thereof is to provide a method of controlling an EGR valve which is able to prevent previously the occurrence of a seizure in the event the valve shaft has ceased to move.

DISCLOSURE OF INVENTION

A method of controlling an EGR valve according to the invention in which a valve-open position is controlled by a torque balance between a return torque given by urging means in the valve closing direction and a motor torque given by a motor in the valve opening direction, comprises the step of stopping power feeding to the motor if an open close valve failed to operate despite a full (100%) continuous power feeding to the motor for a predetermined period of time or more.

Therefore, even if a valve shaft ceases to move due to biting, clogging of dirt, or the like, the occurrence of a seizure of the motor can be prevented previously.

In the method of controlling an exhaust gas recirculation valve according to the invention further comprises the step of driving the motor in the valve closing direction and thereafter driving the motor in the valve opening direction again if the open-close valve failed to operate despite a full (100%) continuous power feeding to the motor for a predetermined period of time or more.

Therefore, even in case the valve shaft ceases to move due to biting, clogging of dirt, or the like, it is possible to remove the clogging of dirt, or the like to thereby drive the valve shaft again.

In the method of controlling an exhaust gas recirculation valve according to the invention further comprises the step of gradually decreasing the driving current to the motor from a valve-opening position exceeding a target position in a steady state so as to cause the open-close valve to move in the valve closing direction by the return torque until the valve-opening position closes to the target position.

Therefore, it is possible to open the valve to the target valve-open position quickly and stably with a small amount of driving electric current.

In the method of controlling an exhaust gas recirculation valve according to the invention further comprises the step of lowering a driving frequency for opening and closing a power feeding circuit to the motor if an ON-duty to open and close the power feeding circuit becomes larger than a set value.

Therefore, when the valve shaft becomes difficult to move and the driving power to the motor increases, the opening and closing frequency of the power feeding circuit for the motor can be decreased previously. As a result, it is possible to prevent the damages to the switching element due to heat generation as well as the seizure of the motor.

BEST MODE FOR CARRYING OUT THE INVENTION

In order to describe this invention in more detail, the best mode for carrying out the invention will be described with reference to the accompanying drawings.

This invention is directed to a method of controlling an EGR valve of a unipolar drive construction in which a return torque is given by urging means in one direction (in the valve closing direction) of an open-close valve and a motor torque is given by a motor M in the other direction (in the valve opening direction) so that the open-close valve is opened to a target position by a torque balance between the both torque, comprising the step of stopping the power feeding to the motor M if the open-close valve failed to operate despite a full (100%) continuous power feeding to the motor M for a predetermined period of time or more.

The operation of the invention will now be described.

Figure 7:
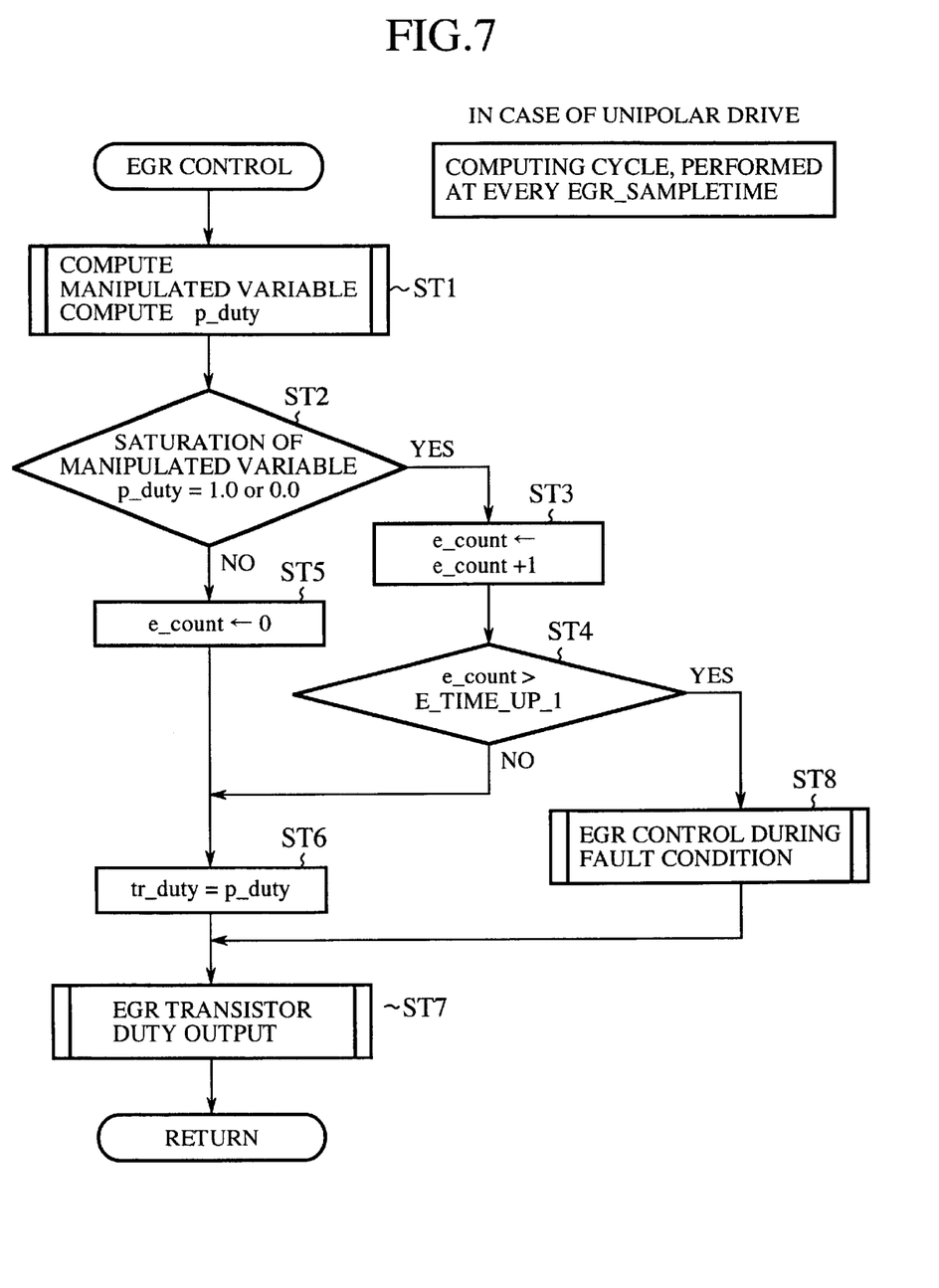
FIG. 7 is a flow chart explaining the control method of the invention.

FIG. 7 is a flow chart explaining the control method of the invention. Incidentally, the internal processing at step ST1, step St7, and step ST8 will be shown below in FIGS. 8–10.

First, a manipulated variable is computed, i.e., a process duty (p-duty) is calculated (step ST1), and a judgement is made as to whether this manipulated variable is saturated at a full (100%) power feeding (1.0) or at a non-power feeding (0.0) (step ST2). If YES, the number of saturation (e-count) is incremented by 1 (i.e., e-count+1) (step ST3), and further a judgement is made as to whether the time to be determined by this number of saturation (e-count) has exceeded a predetermined full (100%) power feeding time (E-TIME-UP-1) (step ST4). If YES, the EGR control during fault condition is executed (step ST8), otherwise the processing proceeds to step ST6.

At step ST2, if NO, the number of saturation (e-count) is zero (0) cleared (step ST5). Then, the calculated process duty (p-duty) is set to a transistor duty (tr-duty) for opening and closing a transistor (switching element) which opens and closes the power feeding circuit for the motor M (step ST6), and an EGR transistor duty is outputted (step ST7). The RGR control during fault condition is performed at every EGR-SAMPLE TIME.

Next, the computation of the manipulated variable, the EGR control during fault condition, and output of the EGR transistor duty performed at step ST1, step ST8, and step ST8 respectively in FIG. 7 will be described.

Figure 8:
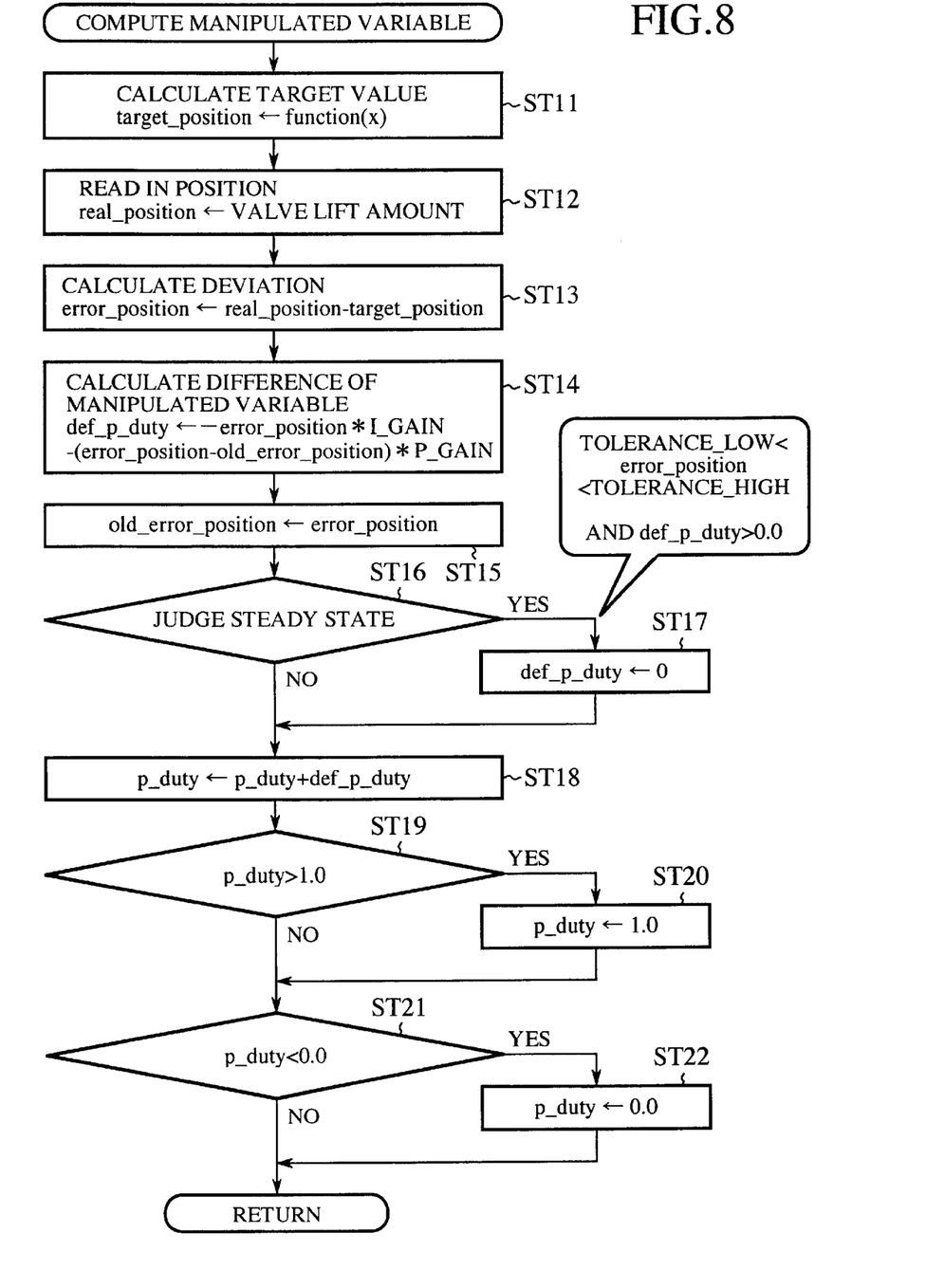
FIG. 8 is a subflow chart explaining a computation of the manipulated variable at step St1 in FIG. 7.

FIG. 8 is a subflow chart explaining the computation of the manipulated variable at step ST1 in FIG. 7.

Function (x) is set to the target-position (step ST11), and the valve lift amount detected by the position sensor 40 to the current position amount (real-position)(step ST12). The deviation (error-position) is obtained by the following formula (step S13)

(real-position)−(target-position).

Then, a difference (def-p-duty) of the manipulated variable is obtained by the following formula (step ST14)

−(error-position)×I-GAIN (integration constant)−(error-position−old-error-position)×P-GAIN (proportional constant).

Thereafter, the deviation (error-position-) obtained by the above calculation is set to the previous deviation (old-error-position) (step ST15). A judgement on a steady state is made based on the deviation value (step ST16). If YES, the difference (d-p-duty) is zero (0) cleared (step ST17), otherwise the above process duty (p-duty) is increased by adding the difference (def-p-duty)(step ST18). In case of YES, the deviation value is within a range of tolerance and is judged to be in a steady state.

A judgement is made as to whether the process duty (p-duty) is more than the full (100%) power feeding (1.0) (step ST19). If YES, the full (100%) power feeding (1.0) is set to the process duty (p-duty) (step ST20), otherwise, a judgement is made as to whether the process duty (p-duty) is less than the non-power feeding (0.0) (step ST21). If YES, the non-power feeding (0.0) is set to the process duty (p-duty) (step St22) otherwise the computation of the manipulated variable is finished.

Figure 9:
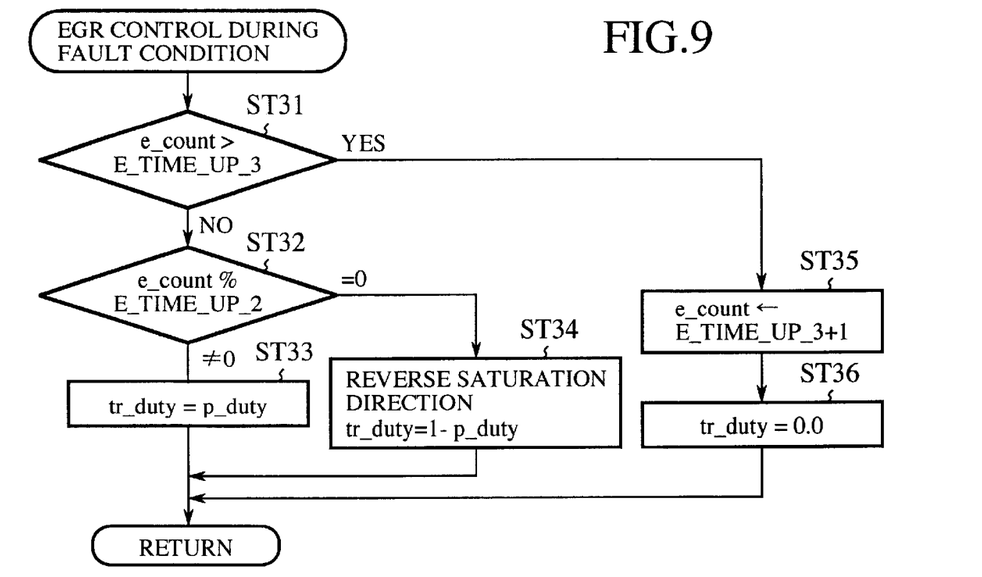
FIG. 9 is a subflow chart explaining an EGR control during fault condition at step ST8 in FIG. 7.

FIG. 9 is a subflow chart explaining the EGR control during fault condition at step ST8 in FIG. 7.

First, a judgement is made as to whether the time to be determined by the number of saturation (e-count) has exceeded the predetermined full (100%) power feeding time by three times (E-TIME-UP-3) or not (step ST31). If YES, the predetermined full (100%) power feeding time by three times (E-TIME-UP-3) is incremented by 1 (i.e., E-TIME-UP-3+1) and is set to the number of saturation (e-count) (step ST35), and the non-power feeding (0.0) is set to the transistor duty (tr-duty) (step ST36).

At step ST31, if NO, a judgement is made as to whether there is a remainder by dividing the predetermined full (100%) power feeding time (E-TINE-UP-2) by the time to be determined by the number of saturation (e-count) (step ST32). If there is a remainder (≠0), the process duty (p-duty) is set to the transistor duty (tr-duty)(step ST33), otherwise (=0) 1-process duty is set to the transistor duty (tr-duty), thereby reversing the direction of saturation, i.e., the rotation of the motor M (step ST34). After that, the operation of the EGR control during fault condition is finished.

Figure 10:
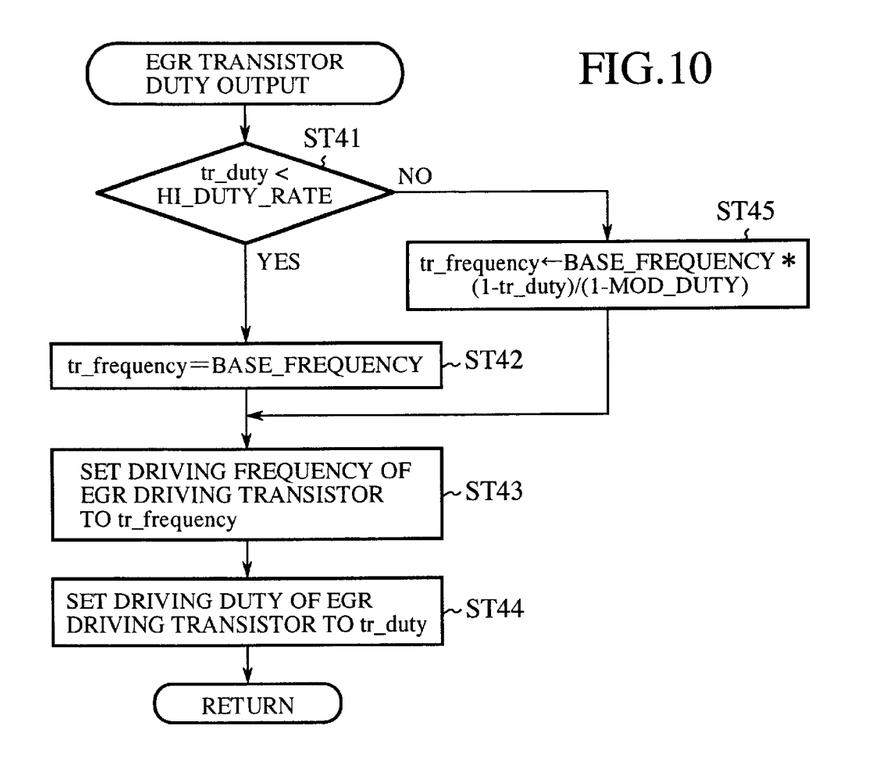
FIG. 10 is a subflow chart explaining an EGR transistor duty output of the EGR transistor duty at step ST7 in FIG. 7.

FIG. 10 is a subflow chart explaining the output of the EGR transistor duty at step ST7 in FIG. 7.

First, a judgement is made as to whether the transistor duty (tr-duty) is less than a judgement duty (HI-DUTY-RATE) which is a constant obtained in advance by through experiment or simulation (step ST41). If YES, the base frequency (BASE-FREQUENCY) which is the fundamental frequency is set to a transistor frequency (tr-frequency) (step ST42), otherwise the resultant of the following formula is set to the transistor frequency (tr-frequency) and the processing proceeds to step ST43 (step ST45)

BASE-FREQUENCY×(1-tr-duty)/(1-MOD-DUTY).

Then, the driving frequency of the EGR driving transistor is set to the transistor frequency (tr-frequency) (step ST43), and the driving duty of the EGR driving transistor is set to the transistor duty (tr-duty) (step ST44). After that, the output of the EGR transistor duty is finished.

As mentioned above, according to the invention, if the open-close valve does not operate despite a full (100%) continuous power feeding to the motor for a predetermined period of time or more, the power feeding to the motor is stopped. In this manner, even in case the valve shaft ceases to move due to biting, clogging of dirt, or the like, it is possible to prevent previously the occurrence of a seizure by an unnecessary power feeding.

In addition, if the open-close valve does not operate despite a full (100%) continuous power feeding to the motor for a predetermined period of time or more, the motor is driven in the reverse direction and thereafter is driven in the forward direction. In this manner, the biting, clogging of dirt, or the like is removed and the valve shaft is driven again.

Further, in a steady state, the driving current to the motor is gradually decreased from a valve-opening position beyond a target position so as to cause the open-close valve to move in the valve closing direction until the valve-opening position closes to the target position. Having been taken such an arrangement, it is possible to coincide the valve-opening position with the target position quickly and stably with a small amount of driving current.

Still further, if an ON-duty for opening and closing the power feeding circuit for the motor becomes larger than a set value, the driving frequency for opening and closing the power feeding circuit for the motor is lowered. Having been taken such an arrangement, when the valve shaft becomes difficult to move and accordingly the power fed to the motor increases, the number of opening and closing the power feeding circuit for the motor can be reduced. As a result, it is possible to prevent previously the damage to the switching element due to heat generation and the seizure of the motor.

While In the above embodiment, a description was made about the PI control, the invention may also be applied to the PID control as a matter off course because PID control belongs to the category of PI control.

Industrial Applicability

As described above, the apparatus for controlling the exhaust gas recirculation valve according to the invention is suitable for quickly performing the operation of partly recirculating the exhaust gas in the exhaust passage "a" to the intake passage "b" in response to the change in the operating conditions of the engine.

What is claimed is:

1. A method of controlling an exhaust gas recirculation valve wherein a valve-open position is controlled by a torque balance between a return torque given by urging means in the valve closing direction and a motor torque given by a motor in the valve opening direction, comprising the step of stopping power feeding to said motor if an open-close valve failed to operate despite a full (100%) continuous power feeding to said motor for a predetermined period of time or more.

2. The method of controlling an exhaust gas recirculation valve according to claim 1, further comprising the step of driving said motor in the valve closing direction and thereafter driving said motor in the valve opening direction again if said open-close valve failed to operate despite a full (100%) continuous power feeding to said motor for a predetermined period of time or more.

3. The method of controlling an exhaust gas recirculation valve according to claim 1, further comprising the step of gradually decreasing the driving current to said motor from a valve-opening position exceeding a target position in a steady state so as to cause said open-close valve to move in the valve closing direction by the return torque until said valve-opening position closes to the target position.

4. The method of controlling an exhaust gas recirculation valve according to claim 1, further comprising the step of lowering a driving frequency for opening and closing a power feeding circuit for said motor if an ON-duty to open and close said power feeding circuit becomes larger than a set value.

* * * * *